United States Patent [19]
Taniguchi

[11] Patent Number: 5,664,914
[45] Date of Patent: Sep. 9, 1997

[54] DRILL

[75] Inventor: Teppei Taniguchi, Hamamatsu, Japan

[73] Assignee: Kabushiki Kaisha Mekuto, Hamamatsu, Japan

[21] Appl. No.: 307,237

[22] Filed: Sep. 16, 1994

[30] Foreign Application Priority Data

Apr. 27, 1994 [JP] Japan ................... 6-112323
Jul. 1, 1994 [JP] Japan ................... 6-173507

[51] Int. Cl.$^6$ ................................. B23B 51/00
[52] U.S. Cl. ................ 408/199; 408/224; 408/227
[58] Field of Search ................. 408/227–229, 408/199, 223, 224

[56] References Cited

U.S. PATENT DOCUMENTS

| | | | |
|---|---|---|---|
| 1,072,543 | 9/1913 | Whyte | 408/227 |
| 2,260,288 | 10/1941 | Black | 408/228 |
| 3,121,351 | 2/1964 | Mount | 408/228 |
| 4,440,532 | 4/1984 | D'Apuzzo | 408/229 |

FOREIGN PATENT DOCUMENTS 0015606   1/1982   Japan ........................... 408/227

*Primary Examiner*—Steven C. Bishop
*Attorney, Agent, or Firm*—Oblon, Spivak, McClelland, Maier & Neustadt, P.C.

[57] ABSTRACT

A drill comprising a holding section, a prismal section receivable by the holding section, and a top-truncated, pyramidal section which is integral with the prismal section, with the prismal section having side faces and side ridges defined by the adjoining two side faces, the top-truncated, pyramidal section having end faces which taper and coverage on the axis of rotation of the drill, end ridges which are defined by meeting of the adjoining two end faces, and a truncated surface extending across the axis of rotation and forming an angle of more than 1° to less than 90° with the cross-section of the prismal section. The end faces and end ridges of the pyramidal section extend from said side faces and side ridges of the prismal section, respectively. Because the apex of the drill is located out of the axis of rotation, it has enhanced cutting performance.

15 Claims, 16 Drawing Sheets

DRILL

BACKGROUND OF THE INVENTION

1. Field of the Invention

This Invention relates to a drill, for example, for use in working metal, crushing fragments of broken tap left in a tapped hole, and drilling a concrete body.

2. Description of the Prior Art

FIG. 28 and FIG. 29 show a drill 301 of a prior art, conventional type.

The drill 301 comprises a sintered body of a high-speed steel powder.

The drill 301 has a quadrangular prismal section 302 and has a quadrangular pyramidal section 303, which are formed integrally with each other. The pyramidal section 303 is formed by cutting off an end portion of the prismal section 302, to form four projecting, end faces which taper and converge on the axis of rotation L of the drill 301, which passes through apex 303a.

In the drill 301, because the apex 303a is located on the axis of rotation L, the apex 303a scarcely rotates, that is, the apex portion fulfills no or very poor cutting function.

Consequently, as shown in FIG. 28, when crushing fragments of broken tap 305 left in a tapped hole 304, the apex 303a impinges upon the fragments 305. As a result, the fragments 305 can not be effectively crushed.

Also, when the drill 301 is used with an enhanced pressure loading in order to increase cutting performance, the apex 303a may slide crosswisely, thus causing breakage thereof or damage to the female screw of the tapped hole 304.

FIG. 30 and FIG. 31 show a drill 401 of another prior art, conventional type.

The drill 401 has a holding section 403, a hexagonal prismal section 405 and a hexagonal pyramidal section 407. The holding section 403 is integral with the prismal section 405. The prismal section 405 is integral with the pyramidal section 407. The pyramidal section 407 has six end ridges 409 which constitute cutting edges 412. The six end ridges 409 of the pyramidal section 407 extend from six side ridges 411 of the prismal section 405, respectively.

The drill 401 is usually adapted in a milling machine or the like and during operation, rotates in the counter-clockwise direction as indicated by the arrow in FIG. 31 so that the cutting edges 412 cut through a work or drill a 0work.

In the drill 401, the cutting edge 412 forms a front rake angle "α" of –60°, which imparts thereto sufficient rigidity. On the other hand, its cutting resistance, however, becomes great. Therefore, the drill may work with diminished efficiency depending on the drill's thickness and/or kind of work selected. Further, the drill 401 has the disadvantage that the chips being produced under operation of the drill 411 cannot smoothly be discharged.

SUMMARY OF THE INVENTION

Accordingly, it is an object of the present invention is to provide a drill which is capable of efficiently cutting through a work or developing excellent cutting performance.

Another object of the invention is to provide a drill which is capable of smoothly discharging chips.

Other and further objects and advantages will be made apparent in the disclosure of the accompanying drawings and the following specification and claims.

The objects above are accomplished in accordance with the present invention.

According to the present invention, there is provided a drill comprising a holding section, a prismal section receivable by the holding section, a top-truncated, pyramidal section integral with the prismal section.

The prismal section having side faces and side ridges defined by the adjoining two side faces, the top-truncated, pyramidal section having end faces which taper and converge on the axis of rotation of the drill, end ridges which are defined by meeting of the adjoining two end faces, and a truncated surface extending across the axis of rotation and forming an angle of more than 0° to less then 90° with the cross-section of the prismal section, and the end faces and end ridges of the pyramidal section extending from said side faces and side ridges of the prismal section, respectively.

DESCRIPTION OF THE PREFERRED EMBODIMENTS

With reference to the drawings, preferred embodiments of the invention are described below.

Figure 1:
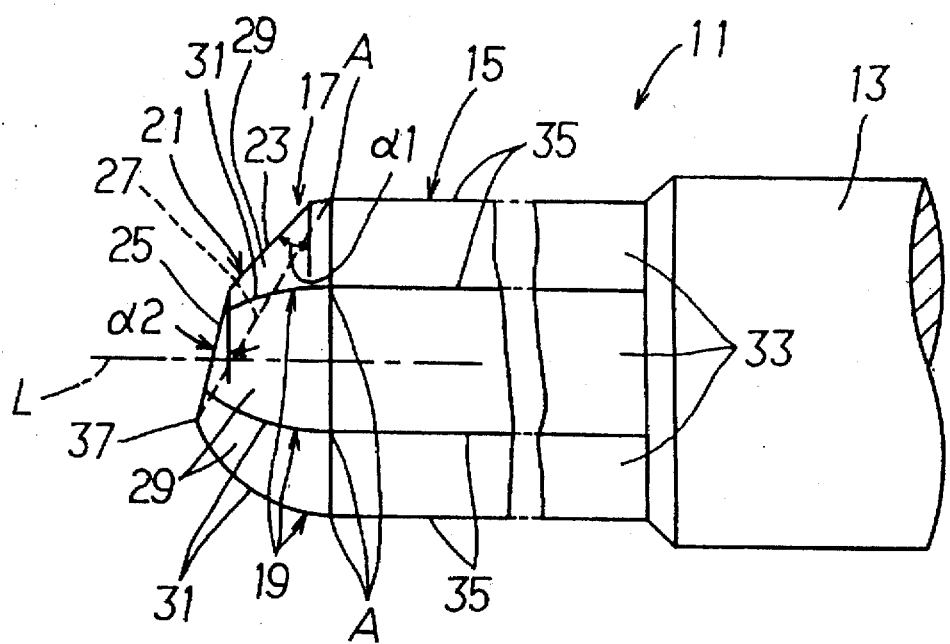
FIG. 1 is a side view of a principal part of a first embodiment drill according to the invention.
Figure 2:
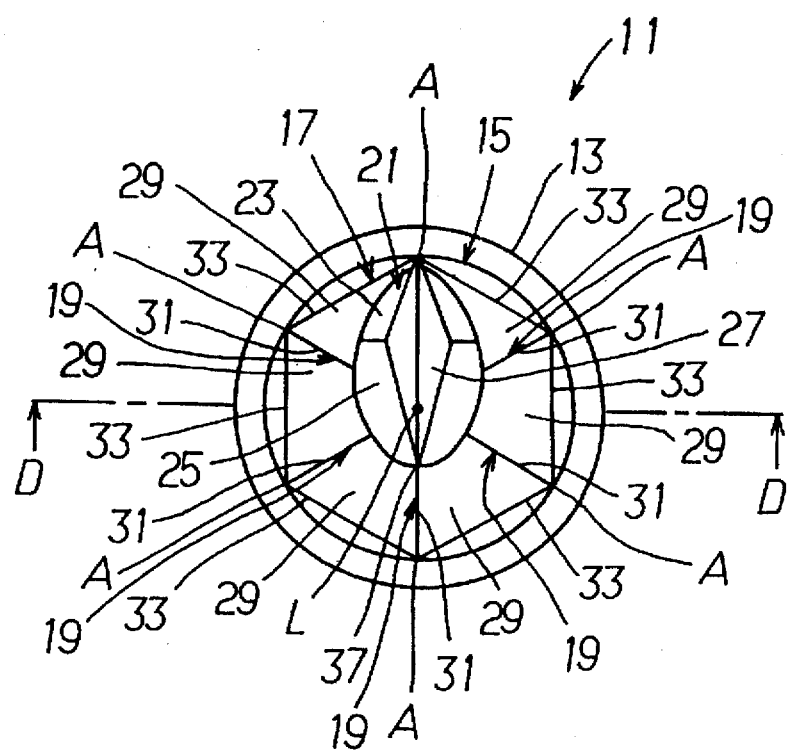
FIG. 2 is a front view of the FIG. 1 drill.
Figure 3:
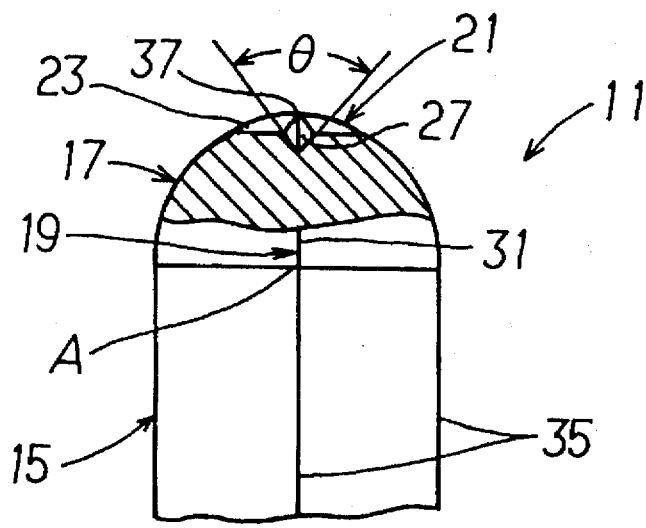
FIG. 3 is a cross-sectional view taken along line D—D shown in FIG. 2.

Referring to FIGS. 1 to 3, there is shown a drill 11 of a first embodiment.

The drill comprises a sintered body of a cemented carbide powder or a high-speed steel powder. The drill can be a tipped drill or a solid tip drill.

The drill 11 has a cylindrical holding section 13, a hexagonal prismal section 15, and a top-truncated, hexagonal pyramidal section 17. The holding section 13 is integral with the prismal section 15, and the prismal section 15 is integral with the pyramidal section 17. The top-truncated pyramidal section 17 has six end faces 29 which taper and converge on the axis of rotation L of the drill 11 and six end ridges 31 defined by the meeting of the adjoining two end faces 29. The and ridges 31 constitute cutting edges 19.

The end faces 29 and end ridges 31 of the pyramidal section 17 extend from side faces 33 and side ridges 35 of the prismal section 15, respectively. Each of the end faces 29 of the pyramidal section 17 equiangularly taper and converge so that the end ridges 31 draw a circular arc with a radius which is one half of the diameter of the cross-section of the prismal section 15.

The pyramidal section 17 has a truncated surface 21.

The truncated surface includes planes 23 on the peripheral side and planes 25 on the axis of rotation L side. The planes 25 extend across the axis of rotation L.

The planes 23 form an inclined angle "α1" of about 45 with the cross-section of the prismal section 15. The planes 25 form an inclined angle "α2" of about 15° with the cross-section of the prismal section 15. The apex 37 defined by meeting of the two planes 25 and the two end faces 29 in located out of the axis of rotation L.

Through the truncated surface 21, a V-shaped groove 27 is formed. The groove 27 extends through the truncated surface 21, from the apex 37 longitudinally to an end point A on a side ridge 31 of the prismal section 15. The opposite faces of the groove 27 form an angle of about 90° with each other.

Because the apex 37 is located out of the axis of rotation L, when the drill 11 rotates, the apex 37 draws a circular arc around the axis of rotation L. Thus, the drill 11 can efficiently cut through the work.

Further, due to the formation of the groove 27, the contact area between the truncated surface 21 and a work becomes small, thus reducing the cutting resistance. Chips are discharged through the groove 27.

Figure 4:
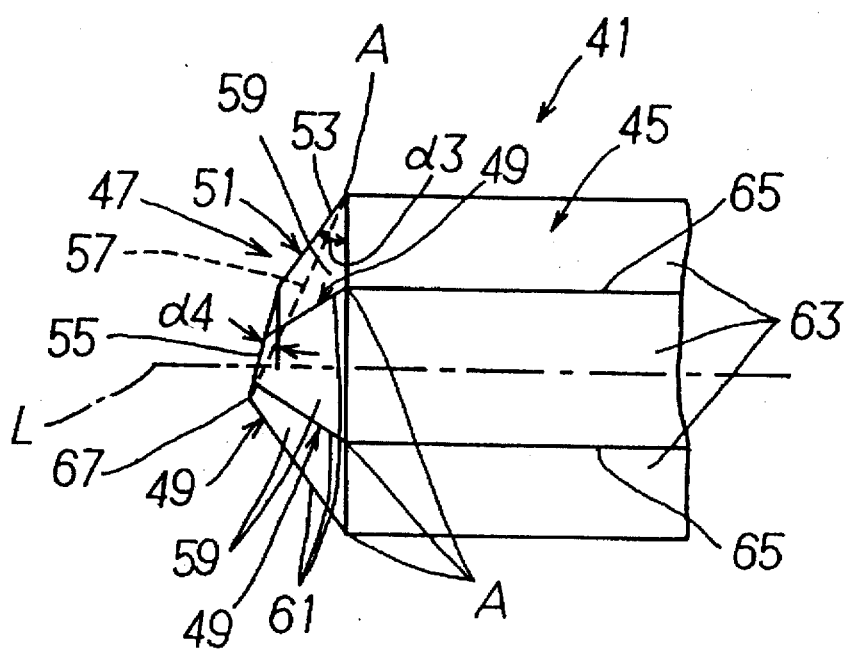
FIG. 4 is a side view of a principal part of a second embodiment drill according to the invention.
Figure 5:
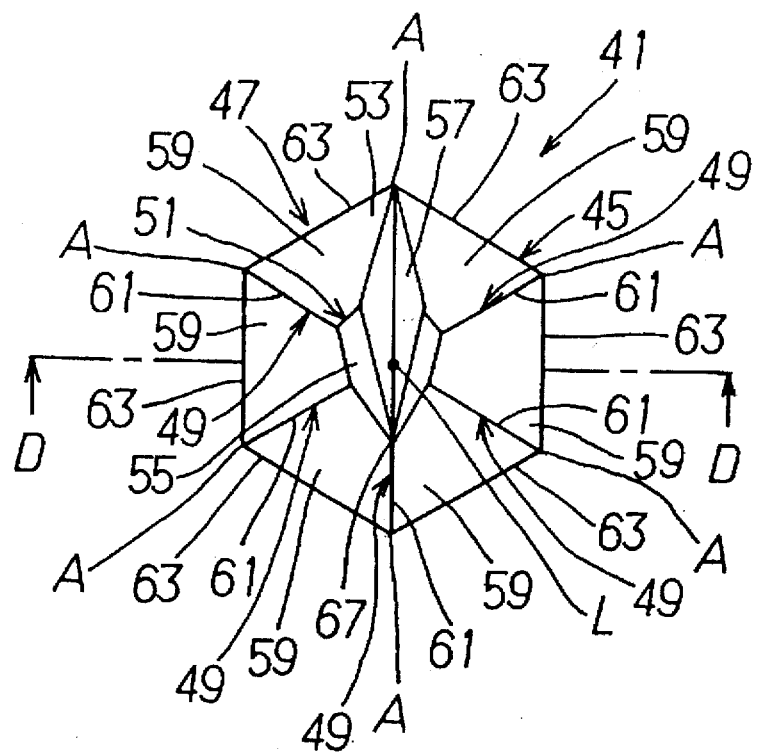
FIG. 5 is a front view of the FIG. 4 drill.
Figure 6:
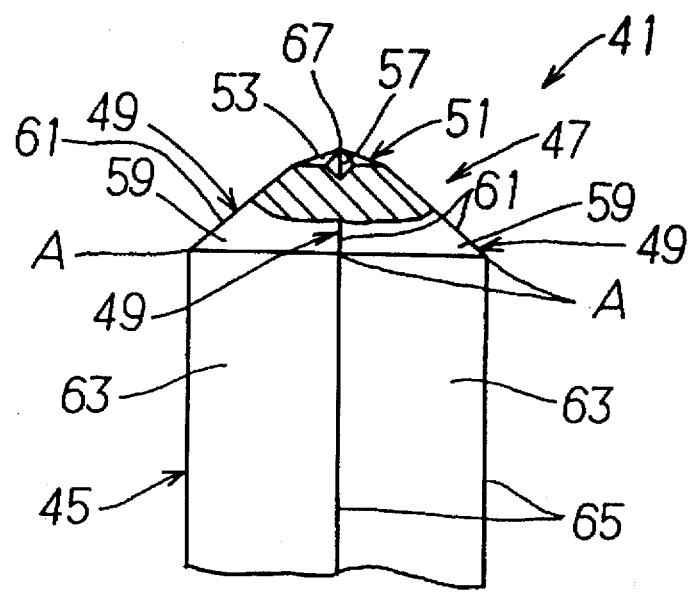
FIG. 6 is a cross-sectional view taken along line D—D shown in FIG. 5.

Referring to FIGS. 4 to 6, there is shown a drill 41 of a second embodiment.

The drill 41 has a hexagonal prismal section 45 and a top-truncated, hexagonal pyramidal section 47, which are integral with each other. The top-truncated, pyramidal section 47 has six end faces 59 which taper and converge on the axis of rotation L and six end ridges 61 defined by the meeting of two adjoining end faces 59. The end ridges 61 constitute cutting edges 49.

The end faces 59 and end ridges 61 of the pyramidal section 47 extend from the side faces 63 and side ridges 65 of the prismal section 45, respectively.

The pyramidal section 47 has a truncated surface 51.

The truncated surface 51 is formed by cutting off the end potion of the pyramidal section 47. The truncated surface 51 includes outer planes 53 on the peripheral side and inner planes 55 on the axis of rotation L side. The inner planes 55 extend across the axis of rotation of L.

The outer planes 53 form an inclined angle "α3" of about 35° with the cross-section of the prismal section 45. The inner planes 55 form an inclined angle "α4" of about 15°. The apex 67 defined by the meeting of the two inner planes 55 and the two end faces 59 is located out of the axis of rotation L.

Through the truncated surface 51, a V-shaped groove 57 is formed. The groove 57 extends longitudinally from the apex 67 to an end point A on the side ridge 51 of the prismal section 55 in the truncated surface 51. The opposite faces of the groove 57 form an angle of about 90° with each other.

The drill 41 works with cutting performance and affect similar to that of the first embodiment drill 11.

With respect to the other embodiment drills, descriptions are given below. Because the following drills have in part the same constitutional features as the first embodiment drill 11, in FIGS. 1–3, the same features are, for simplification of description, denoted with common numeral references.

Figure 7:
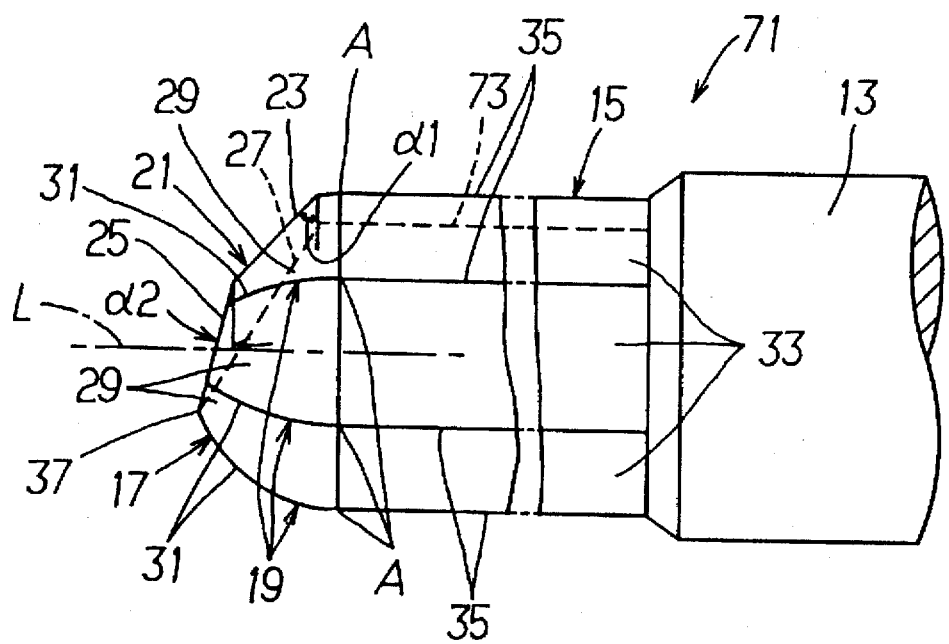
FIG. 7 is a side view of a principal part of a third embodiment drill according to the invention.
Figure 8:
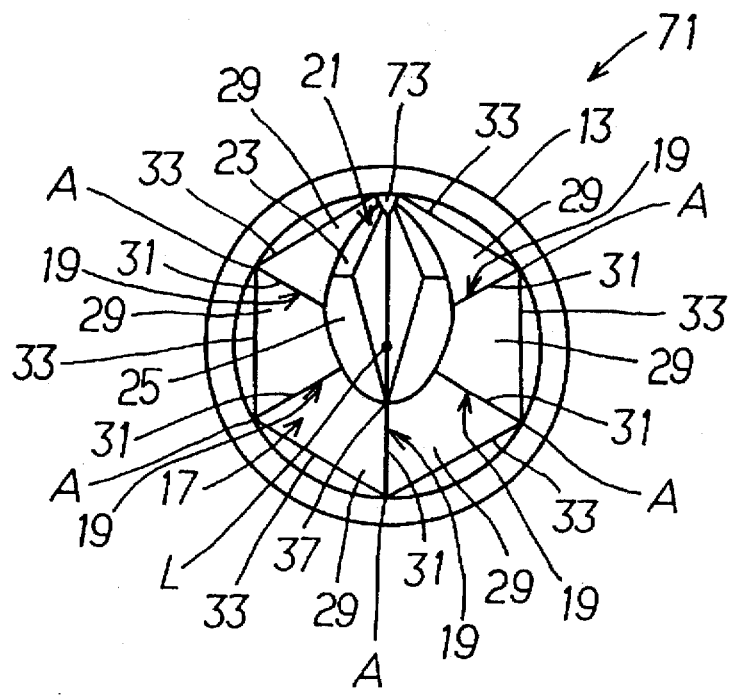
FIG. 8 is a front view of the FIG. 7 drill.

Referring to FIGS. 7 and 8, there is shown a drill 71 of a third embodiment.

The drill 71 has the same constitutional features as the first embodiment drill 11 except that there is formed a communicating groove 73.

The communicating groove 73 is formed to communicate with the groove 27.

In the drill 71, chips are discharged through the groove 27 and the communicating groove 73. Accordingly, when the drill 71 is used, chips are efficiently discharged.

Figure 9:
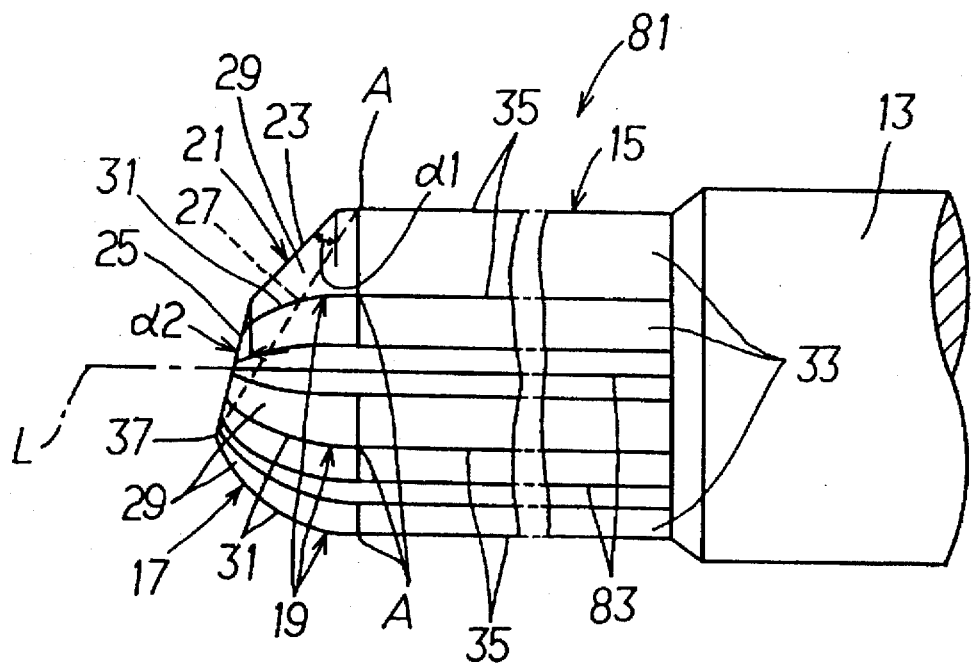
FIG. 9 is a aide view of a principal part of a fourth embodiment drill according to the invention.
Figure 10:
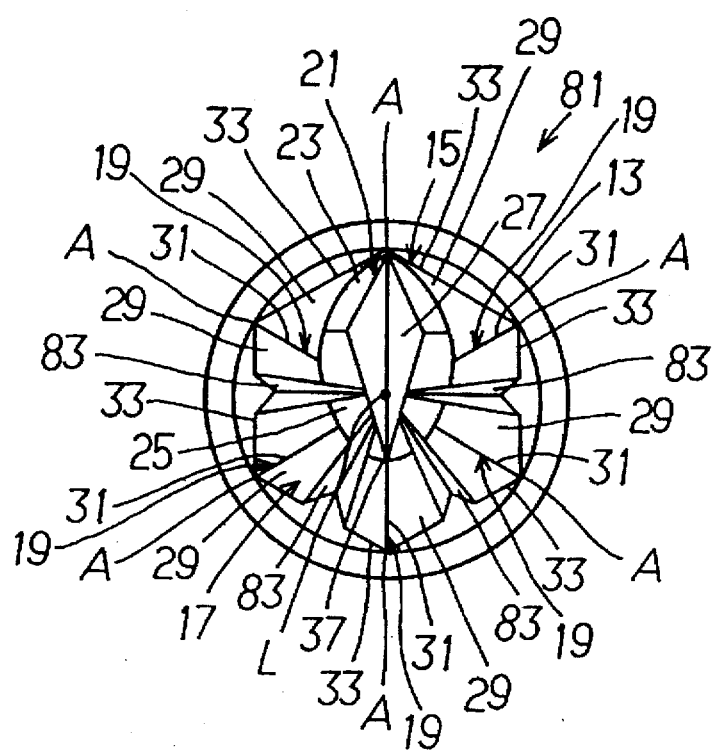
FIG. 10 is a front view of the FIG. 9 drill.

Referring to FIGS. 9 and 10, there is shown a drill 81 of a fourth embodiment.

The drill 81 has the same constitutional features an the first embodiment drill 11 except that there are formed four discharge grooves 83.

The discharge groove 83 is in communication with the groove 27. In the drill 81, chips are discharged through the groove 27 and the discharge grooves 83.

Alternatively, the discharge groove 83 may be out of communication with the groove 27.

Figure 11:
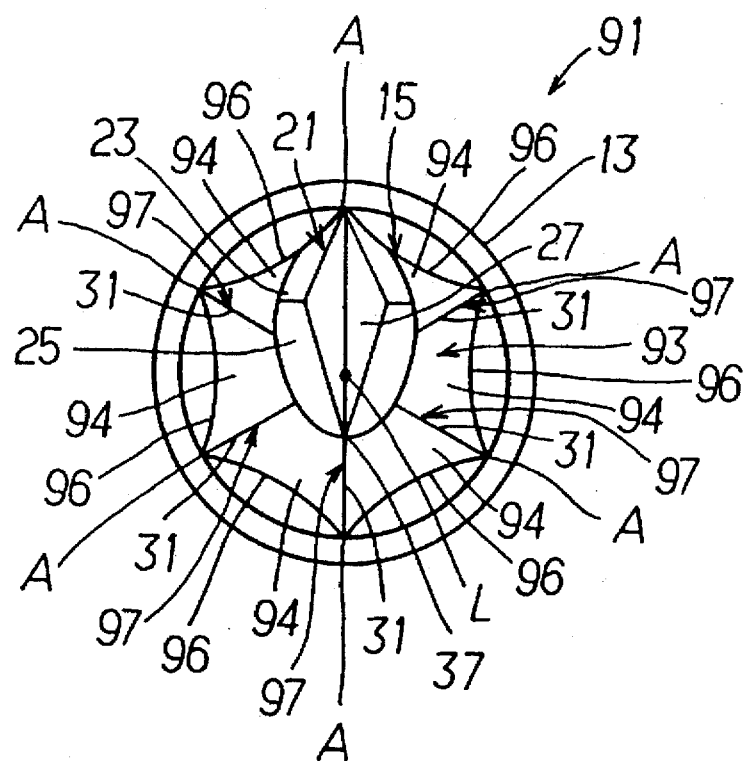
FIG. 11 is a side view of a principal part of a fifth embodiment drill according to the invention.

Referring to FIGS. 11, there is shown a drill 91 of a fifth embodiment.

The drill 91 has the same constitutional features as the first embodiment drill 11 except that there are formed end faces 94 of a pyramidal section 93 and side faces 96 of a prismal section 95 are curved, that is, concave outwardly.

The drill 91 has a front rake angle of a cutting edge 97, which is smaller than that of the first embodiment drill 11. Thus, the drill 91 has improved cutting performance. Further, because the contact area of the cutting edge 97 and the work becomes small, the cutting resistance of the cutting edge 97 is reduced.

Figure 12:
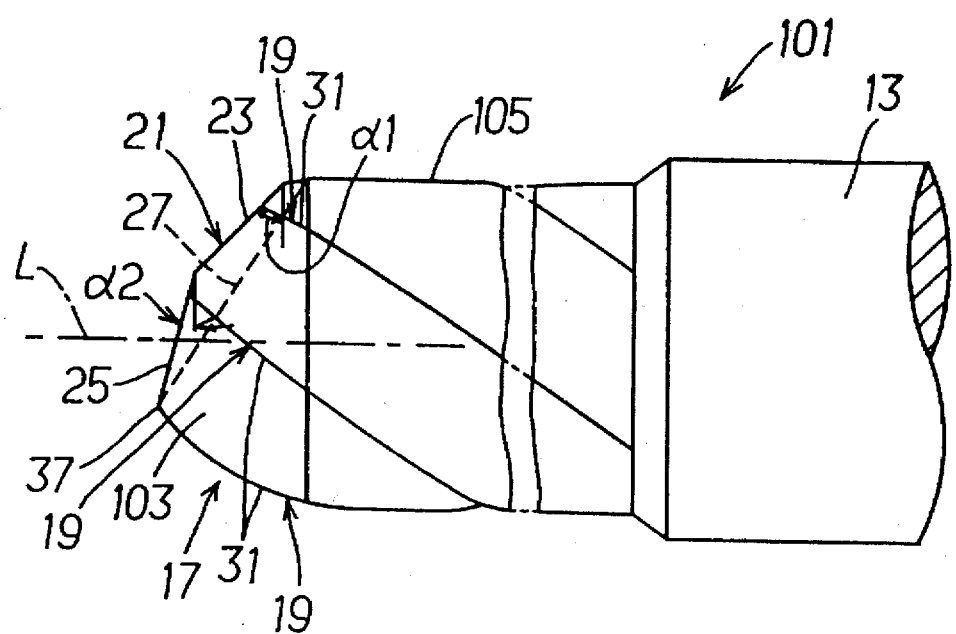
FIG. 12 is a side view of a principal part of a sixth embodiment drill according to the invention.

Referring to FIG. 12, there is shown a drill 101 of a sixth embodiment.

The drill 101 has the same constitutional features as the first embodiment drill 11 except that there are formed a pyramidal section 103 and a twisted, prismal section 105.

Due to the twisted shape, the drill 101 has reduced cutting resistance.

Figure 13:
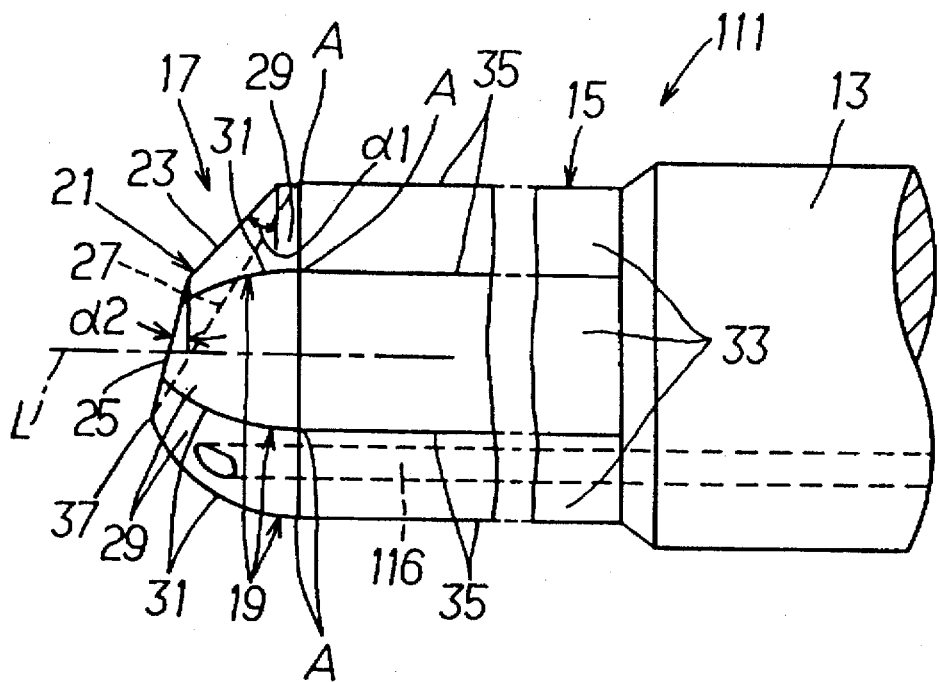
FIG. 13 is a side view of a principal part of a seventh embodiment drill according to the invention.
Figure 14:
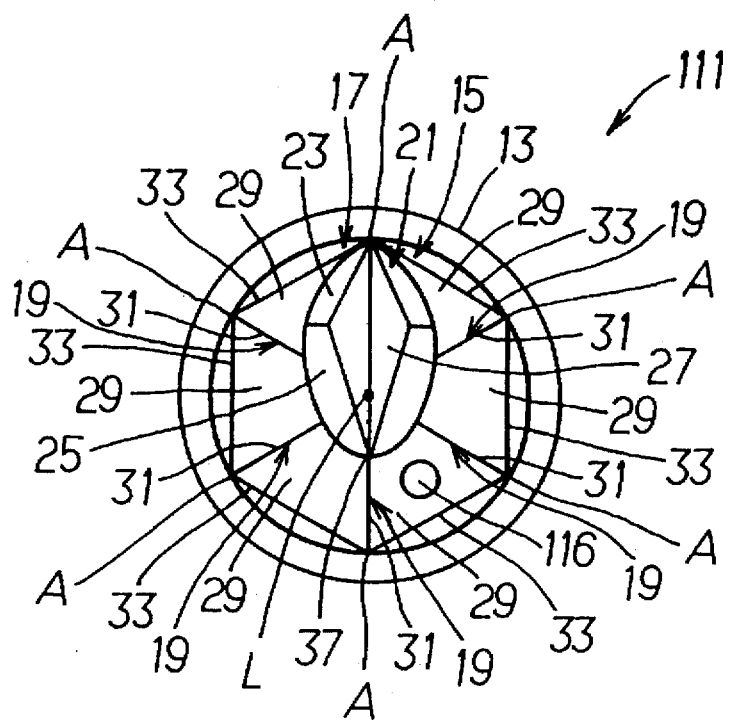
FIG. 14 is a front view of the FIG. 7 drill.

Referring to FIGS. 13 and 14, there is shown a drill 111 of a seventh embodiment.

The drill 111 has the same constitutional features as the first embodiment drill 11 except that there is formed a hole 116. The hole 116 extends through the pyramidal section 17 and the holding section 13.

In the drill 111, a auction means is adapted so that its vacuum vent is contiguous with the opening on the prismal section 13 side. Chips are discharged through the hole 116 with the suction means.

Alternatively, an air blast means is adapted so that its blast hole is contiguous with the opening on the holding section 13 side. Chips are discharged with the aid of air blast means.

Figure 15:
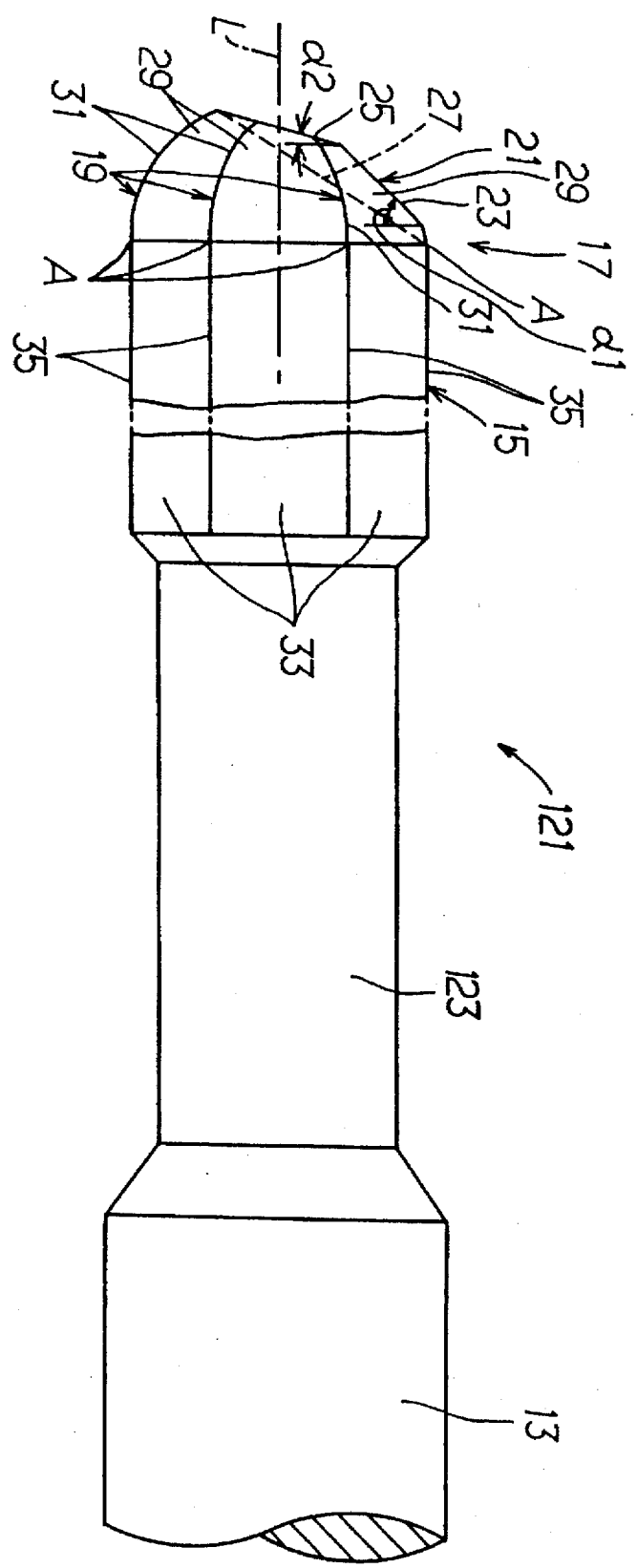
FIG. 15 is a side view of a principal part of an eighth embodiment drill according to the invention.

Referring to FIG. 15, there is shown a drill 121 of an eighth embodiment.

The drill 121 has the same constitutional features as the first embodiment drill 11 except that a holding section 123 is smaller in diameter than the prismal section 15.

In the drill 121, because the holding section 123 is smaller in diameter than the prismal section 15 so that there is created a gap along the periphery of the holding section 123, chip passes through the gap and is discharged. Thus, discharge efficiency of chips are improved.

Alternatively, the holding section 123 may be only in part smaller in diameter than the prismal section 15.

Figure 16:
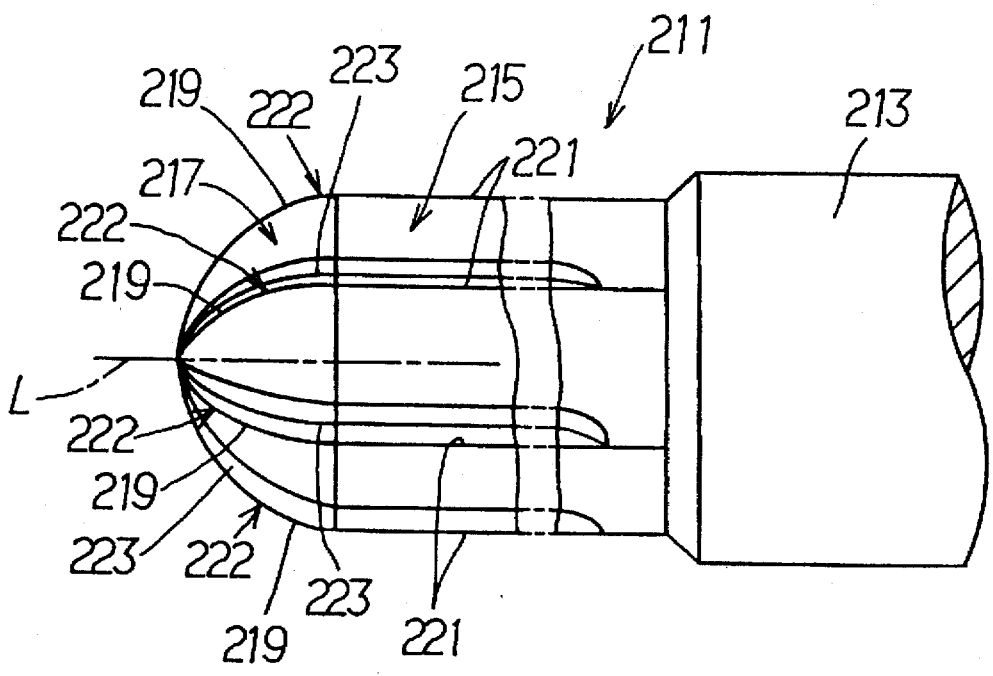
FIG. 16 is a side view of a principal part of a ninth embodiment drill according to the invention.
Figure 17:
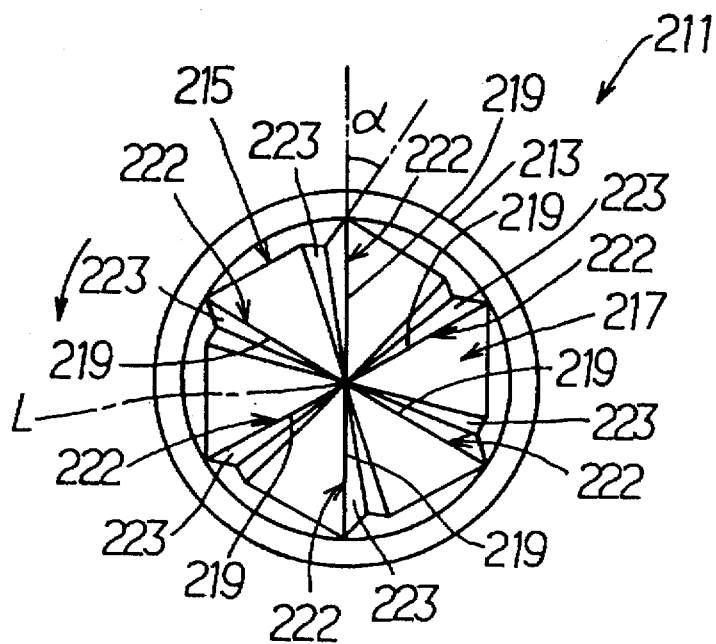
FIG. 17 is a front view of the FIG. 16 drill.

Referring to FIGS. 16 and 17, there is shown a drill 211 of a ninth embodiment.

The drill 211 comprises a sintered body of a cemented carbide powder or a high-speed steel powder. The drill 211 is adapted in a milling machine or the like and, under operation, rotates in the counter-clockwise direction as indicated by arrow in FIG. 17.

The drill 211 comprises a cylindrical holding section 213, a hexagonal prismal section 215, and a top-truncated, hexagonal pyramidal section 217. The holding section 213 is integral with the prismal section 215. The prismal section 217 is integral with the pyramidal section 217.

The pyramidal section 217 has six end ridges 219 which constitute cutting edges 222. The and ridges 219 of the pyramidal section 217 extend from side ridges 221 of the prismal section 215, respectively.

There is formed an along-ridge groove 223 which extends along the end ridge 219 of the pyramidal section 217 and includes the end ridge 219. Further, the along-ridge groove 223 is formed in the forward side of the end ridge 219 with respect to the direction of rotation of the drill 211. The along-ridge groove 223 extends, beyond the pyramidal section 217, to the halfway point of the prismal section 215. On the prismal section 215, the along-ridge groove 223 also extends along the side ridge 221 and includes the side ridge 221.

Due to the formation of the along-ridge groove 223, the front rack angle "α" of the cutting edge 222 is smaller than that of the prior art drill 11. The front rack angle is adjusted to be −30°. Due to the formation of the along-ridge groove 223, the contact area between the pyramidal section 217 and a work becomes smaller than that of the prior art drill 11, thus enabling the reduction of cutting resistance of the drill 211 and an improvement of its cutting performance. Under operation, chips are discharged through the along-ridge groove 223.

Figure 18:
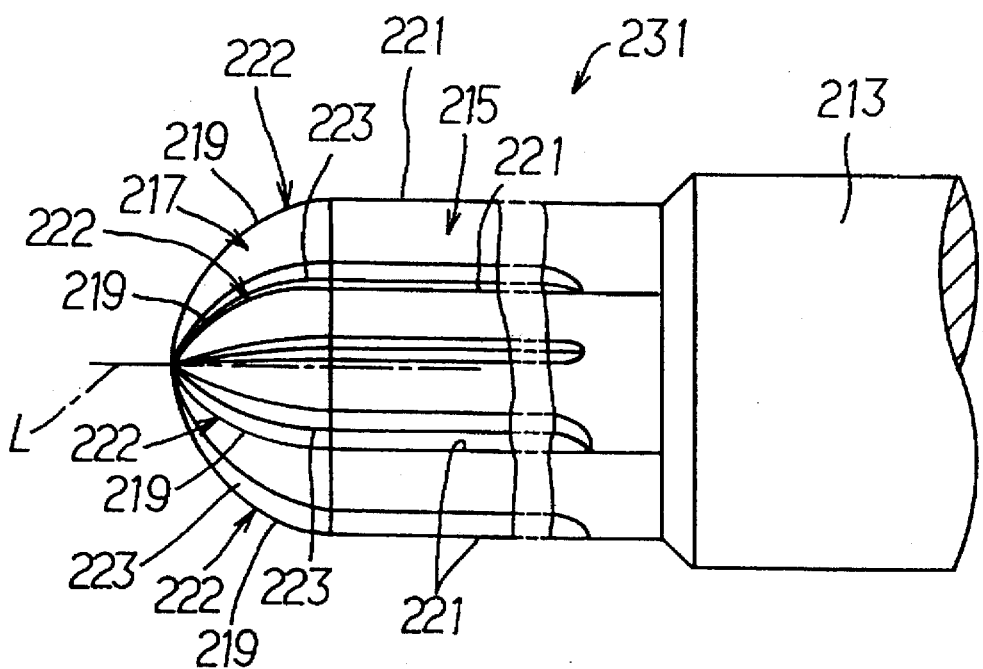
FIG. 18 is a aide view of a principal part of a tenth embodiment drill according to the invention.
Figure 19:
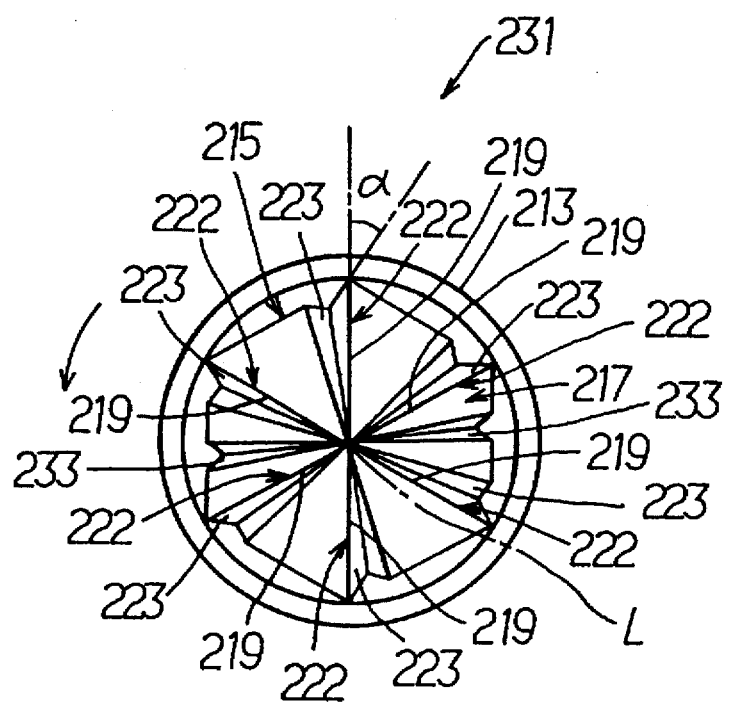
FIG. 19 is a front view of the FIG. 18 drill.

Referring to FIGS. 18 and 19, there is shown a drill 231 of a tenth embodiment.

The drill 231 has the same constitutional features am the ninth embodiment drill 211 except that there is formed a discharge groove 233. Accordingly, for simplification of description, with the same constitutional features, common numeral references are used in FIGS. 18 and 19.

The discharge groove 233 is formed on two positions as shown in FIGS. 18 and 19.

Due to the formation of the discharge groove 233, chip is discharged, not only through the along-ridge 223, but also through the discharge groove 233. Accordingly, chip are discharged more efficiently and surely.

Figure 20:
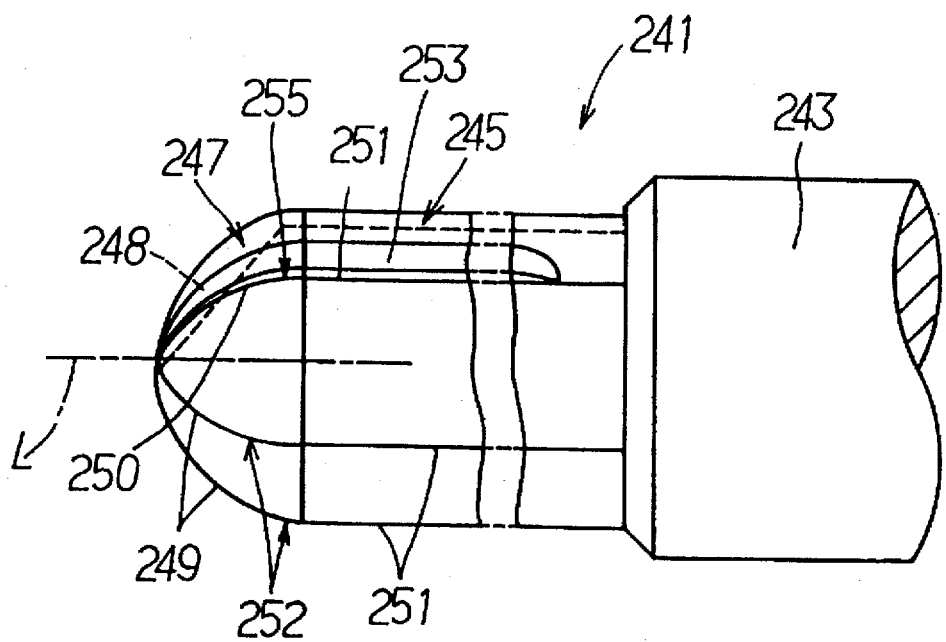
FIG. 20 is a side view of a principal part of an eleventh embodiment drill according to the invention.
Figure 21:
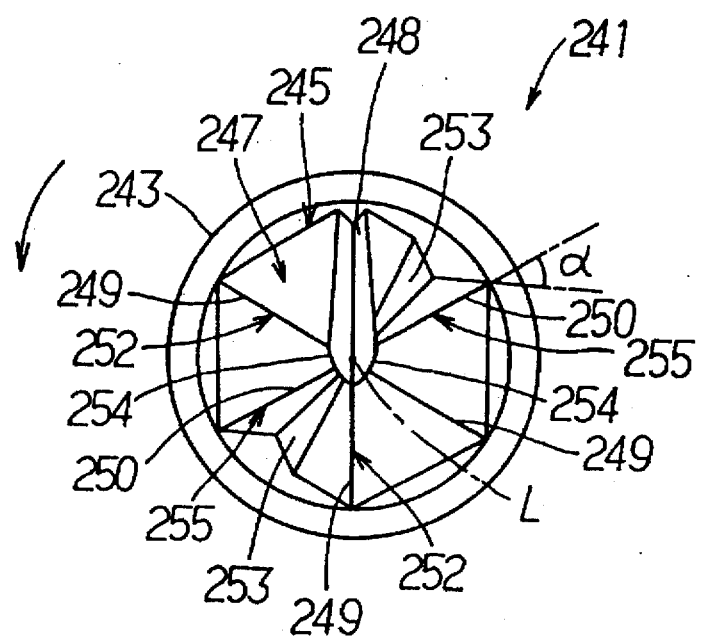
FIG. 21 is a front view of the FIG. 20 drill.

Referring to FIGS. 20 and 21, there is shown a drill 241 of an eleventh embodiment.

The drill 241 comprises a sintered body of a cementated carbide or a high-speed steel. Under operation, the drill 241 is adapted in a milling machine or the like and rotates in the counter-clockwise direction as indicated by arrow in FIG. 21.

The drill 241 comprises a cylindrical holding section 243, a hexagonal prismal section 245, and a top-truncated pyramidal section 247. The holding section 243 is integral with the prismal section 245. The prismal section 245 is integral with the pyramidal section 247. The pyramidal section 247 has five end ridges 249, 250.

There is formed a groove 248 which extends from the pyramidal section 247 to the prismal section 245. The groove 248 extends across the axis of rotation L.

The pyramidal section 247 has five end ridges 249, 250 which constitute cutting edges 252, 255. The five end ridges 249, 250 of the pyramidal portion 247 extend from any five side ridges among six side ridges 251 of the prismal section 245, respectively.

There is formed an along-ridge groove 253 which extends along the end ridge 250, includes the end ridge 250 and is located on the forward side of the end ridge 250 with respect to the direction of rotation of the drill 241.

The along-ridge groove 253 extends, beyond the pyramidal section 247, to the halfway point of the prismal section 245. On the prismal section 245, the along-ridge groove extends along the side ridge 251 and includes the side ridge 251.

In the drill 241, the front rack angle "α" of a cutting edge 255 defined by the end ridge 250, is smaller than that of a cutting edge 252 defined by the ridge 249. The front rack angle "α" of the ridge is adjusted to be −30°. Due to the formation of the along-ridge groove 253, the contact area between the cutting portion 252, 255 and a work becomes small. Accordingly, the drill 241 has reduced cutting resistance and enhanced cutting performance. Chips are discharged through the groove 248 and the along-ridge groove 253.

Because the apex 254 is located out of the axis of rotation L due to the formation of the groove 248, when the drill 241 rotates, the apex 254 draws a circular arc around the axis of rotation L. Accordingly, the drill 241 efficiently cuts through a work.

Figure 22:
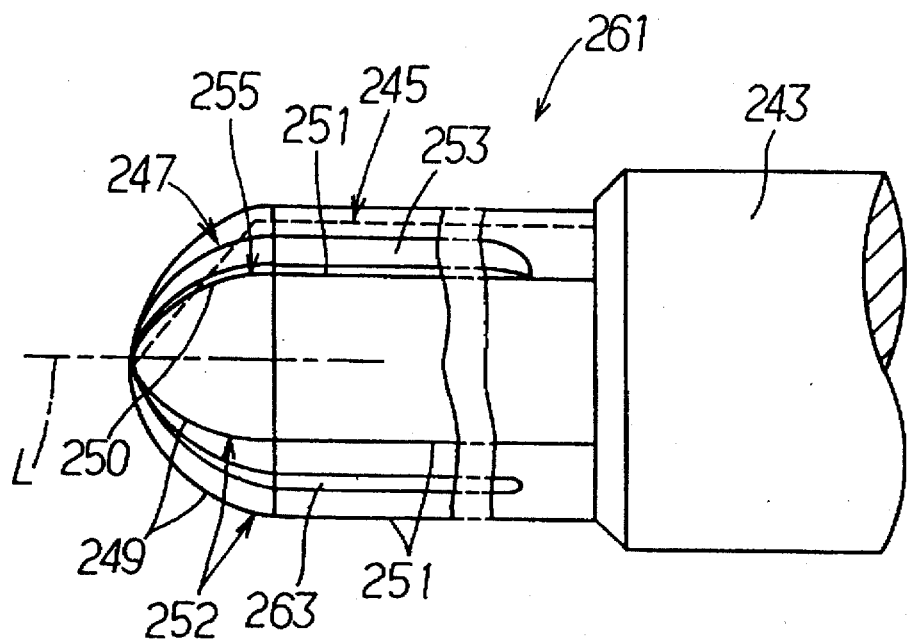
FIG. 22 is a side view of a principal part of a twelfth embodiment drill according to the invention.
Figure 23:
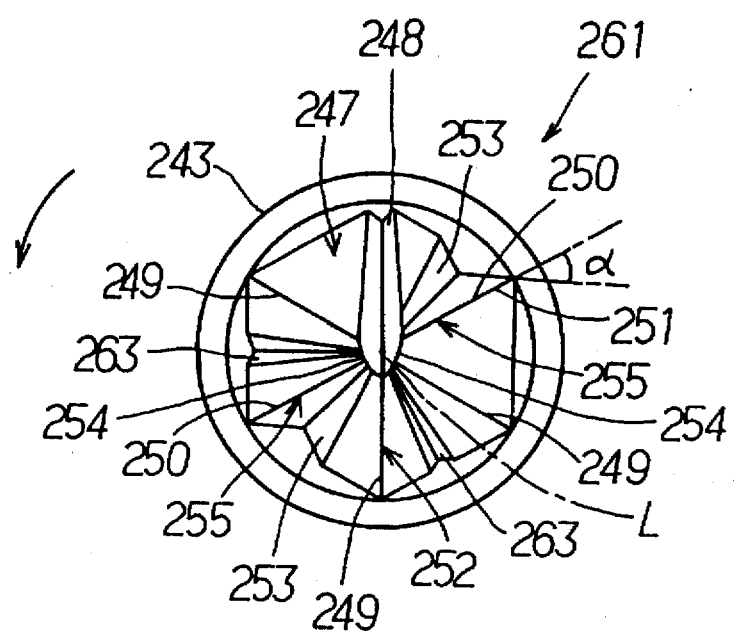
FIG. 23 is a front view of the FIG. 22 drill.

Referring to FIGS. 22 and 23, there is shown a drill 261 of a twelfth embodiment.

The drill 261 has the same constitutional features as the eleventh embodiment drill 241 except that there is formed a discharge groove 263. Accordingly, for simplification of description, common numeral references are used in FIGS. 22 and 23.

There is formed a discharge groove 263 on two positions as shown in FIGS. 22 and 23.

Because the drill 261 has the discharge groove 263, under operation, chips can be discharged through the along-ridge groove 253, the groove 248 and the discharge groove 263. Accordingly, chips can be discharged more efficiently and surely.

Figure 24:
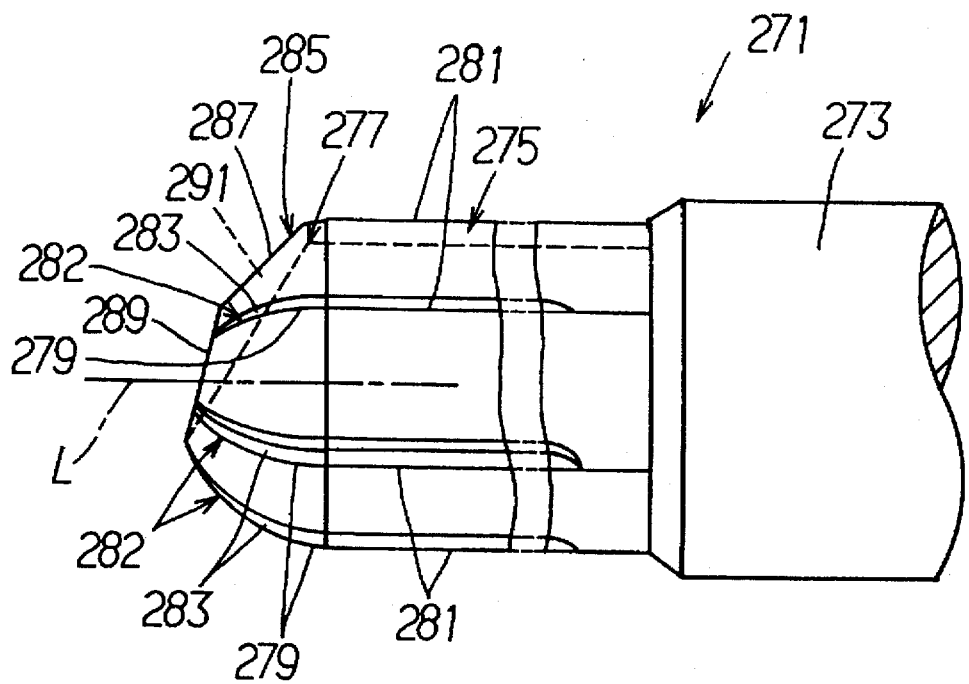
FIG. 24 is a side view of a principal part of a thirteenth embodiment drill according to the invention.
Figure 25:
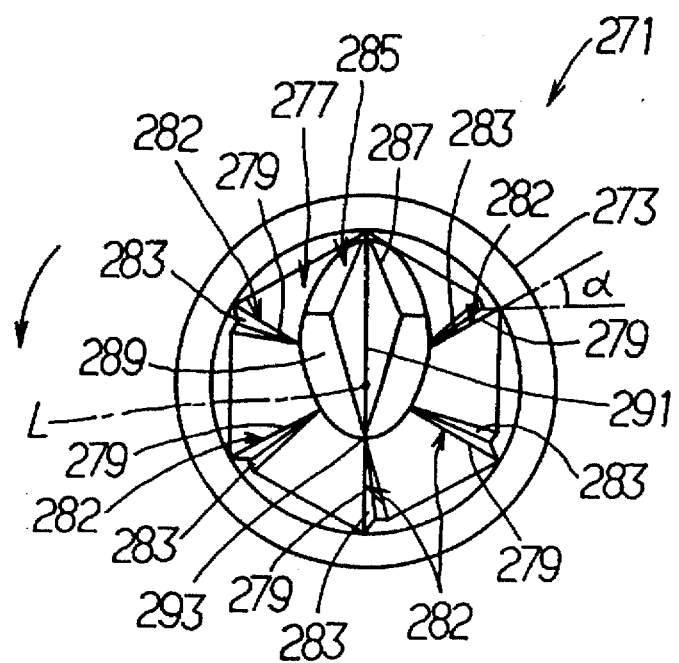
FIG. 25 is a front view of the FIG. 24 drill.

Referring to FIGS. 24 and 25, there is shown a drill 271 of a thirteenth embodiment.

The drill 271 comprises a sintered body of a cemented carbide powder or a high-speed steel powder. The drill 271 is adapted in a milling machine or the like and, under operation, rotates in the counterclockwise direction as indicated by arrow in FIG. 25.

The drill 271 has a cylindrical holding section 273, a hexagonal prismal section 275, and a pyramidal section 277. The holding section 273 is integral with the prismal section 275, and the prismal section 275 is integral with the pyramidal section 277. The pyramidal section 277 has five end ridges 279 which constitute five cutting edges 282. The end ridges 279 of the pyramidal section 277 extend from any five side ridges among six side ridges 281 of the prismal section 275.

There is formed an along-ridge groove 283 which extends along the end ridge 279 and includes the end ridge 279 on the forward side of the drill 271 with respect to the direction of rotation L of the drill 271. The along-ridge groove 283 extends, through the pyramidal section 277, to the halfway point of the prismal section 275. On the prismal section 275, the along-ridge groove 283 extends along the side ridge 281 and includes the side ridge 281.

The pyramidal section 277 is truncated. The truncated surface 285 comprises a plane 287 on the peripheral side and the plane 289 on the axis of rotation L. The plane 289 extends across the axis of rotation L. By cutting through the truncated surface 285, a V-shaped groove 291 is formed so that it extends longitudinally through the truncated surface 285.

In the drill 271, the front rack angle "α" of a cutting portion 282 having an edge defined by the and ridge 279 along which the along-ridge groove 283 extends becomes smaller than that of the cutting portion 282 having an edge defined by the other ridge 279. The front rack angle "α" is adjusted to be 30°. Further, because the along-ridge groove 283 is formed, the contact area between the pyramidal section 277 and a work becomes small. Consequently, the drill 271 has reduced cutting resistance and enhanced cutting performance. Chips are discharged through the gaps defined by the groove 291 and the along-ridge groove 283.

Because the apex 293 is located out of the axis of rotation L, when the drill 271 rotates, the apex draws a circular arc around the axis of rotation L. Consequently, the drill 271 can efficiently cut through a work.

Figure 26:
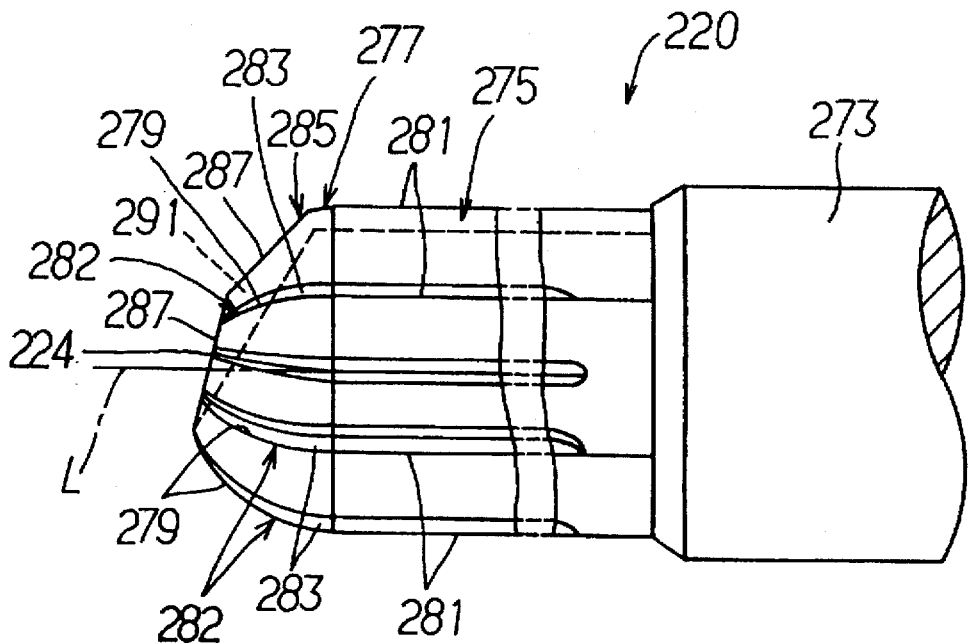
FIG. 26 is a side view of a principal part of a fourteenth embodiment drill according to the invention.
Figure 27:
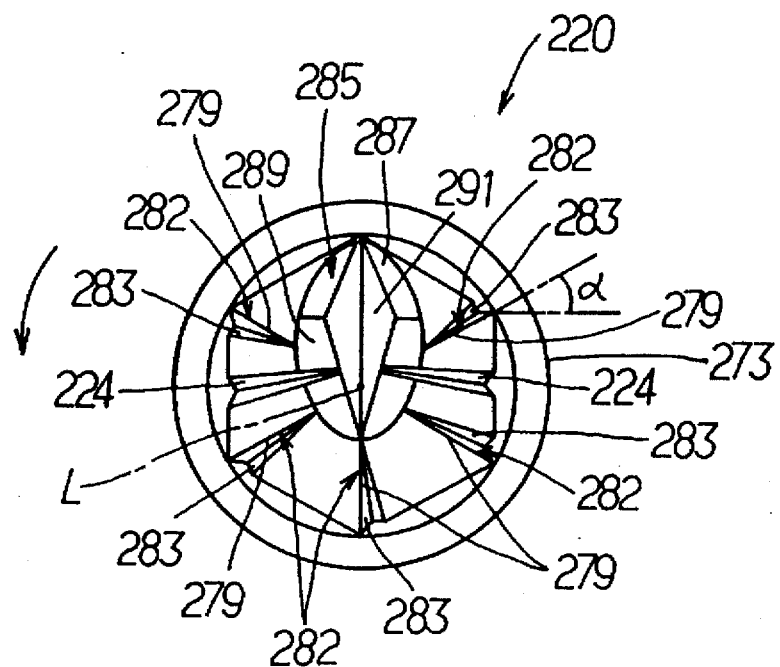
FIG. 27 is a front view of the FIG. 26 drill.
Figure 28:
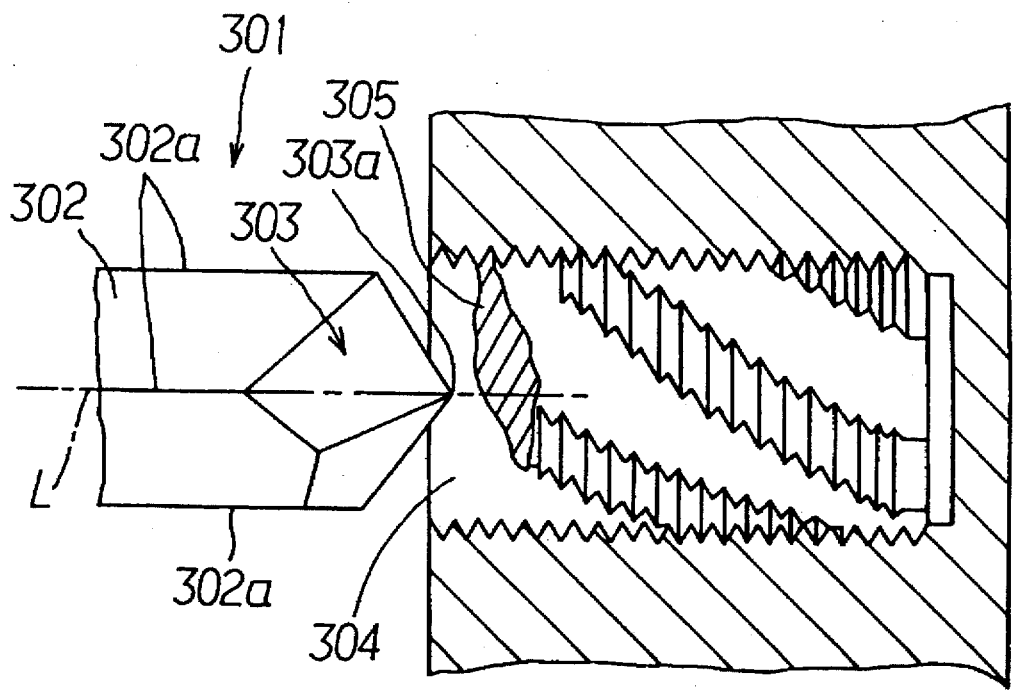
FIG. 28 is a side view of a principal part of a prior art type.
Figure 29:
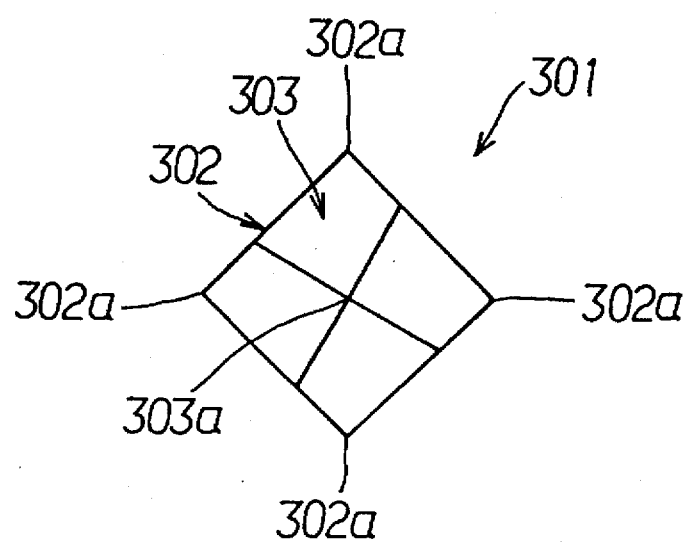
FIG. 29 is a front view of the FIG. 28 drill.
Figure 30:
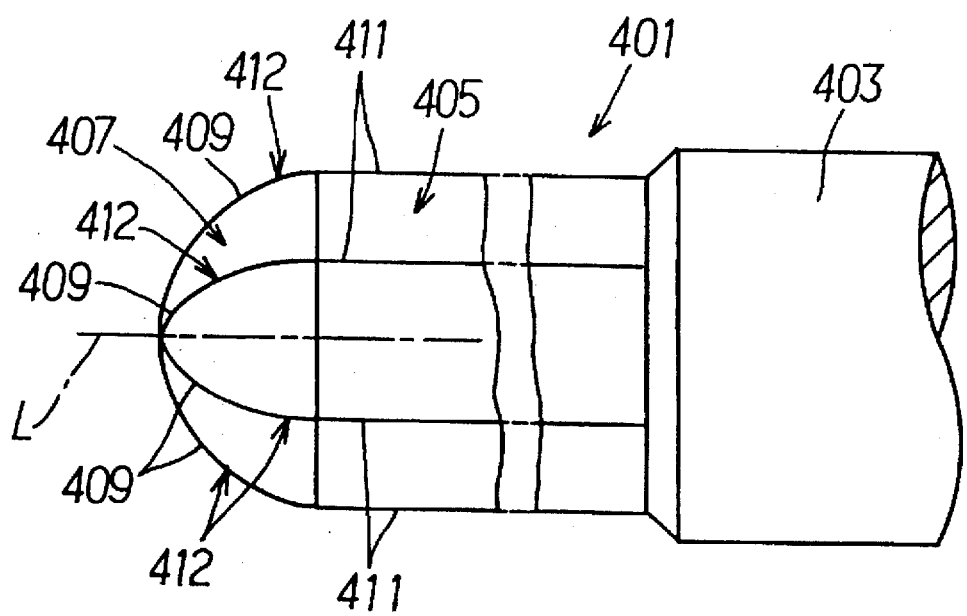
FIG. 30 is a side view of a principal part of another prior art type.
Figure 31:
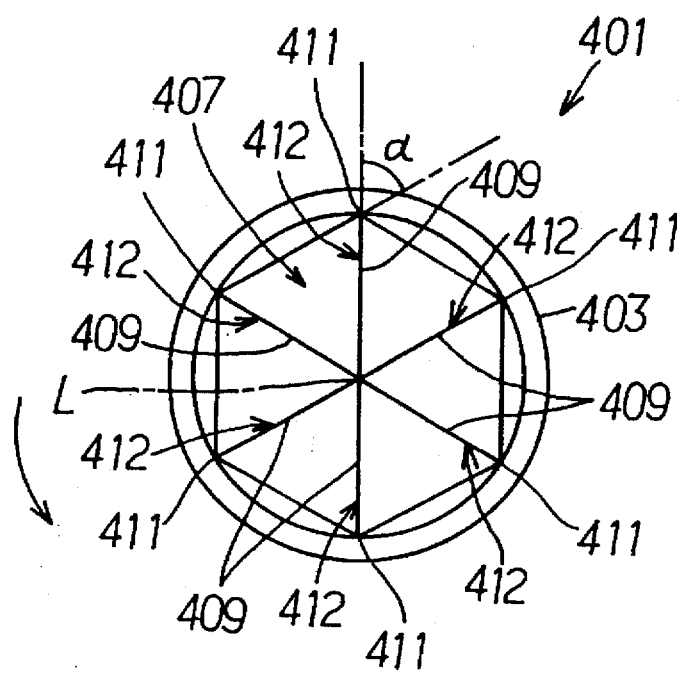
FIG. 31 is a front view of the FIG. 30 drill.

Referring to FIGS. 26 and 27, there is shown a drill 220 of a fourteenth embodiment.

The drill 220 has the same constitutional elements as the thirteenth embodiment drill 271 except that there is formed a discharge groove 224. Accordingly, for simplification of description, common numeral references are used in FIGS. 24 and 25.

The discharge groove 224 is formed on two positions as shown in FIGS. 26 and 27, and communicates with the groove 291.

When the drill 220 is used, chips are discharged not only through the along-ridge groove 283, but also through the discharge groove 224. Accordingly, chips can be discharged more efficiently and surely.

While the invention has been shown and described with reference to the preferred embodiments thereof, It will be understood by those skilled in the art that various changes in form and details may be made without departing from the spirit and scope of the invention.

For example, the drills 81, 91, 101, 111 and 121 of the fourth to eighth embodiments may have such a groove provided as the drill 27 of the third embodiment has the groove 27 provided.

Further, the drills 11, 41, 71, 81, 91, 101 and 111 of the first to seventh embodiments may have holding sections which are, respectively, smaller in diameter than the prismal sections the as is the case with the drill 121 of the eighth embodiment.

While the aforementioned embodiments employ as the pyramidal sections and the prismal sections, hexagonal shapes, respectively, the invention, is not limited thereto, but may employ triangular, quadrangular, pentagonal, heptagonal or other polygonal.

While the aforementioned embodiments employ as the groove 27 or 57 a V-shape, the invention, is not limited thereto, but may employ a U-shape or other shapes.

While the number of the discharge groove 83 of the fourteenth embodiment is four, the invention is not limited thereto, but may employ less than or more than four discharge grooves.

While the ninth to fourteenth embodiments have the along-ridge groove 223, 53, 83 formed so that the front rack angle "α" is −30°, the invention, is not limited thereto, but may have an along-ridge groove with a front rack angle of more than 0° to less than 45°.

While the number of the along-ridge groove 223 of the drill 211 of the ninth embodiment and the drill 231 of the tenth embodiment is six, the invention is not limited thereto, but may suitably employ one to the number of ridges formed depending to the drill thickness, the hardness of the work and the like. Further, the along-ridge groove 223 may extend, but be terminated by the holding section 213, or extend only in the pyramidal section 217.

The size and/or number of the discharge groove 233 may be changed.

While the number of the along-ridge groove 253 of the drill 241 of the eleventh embodiment and the drill 261 of the twelfth embodiment is two, the invention is not limited thereto, but the number of an along-ridge grooves may be changed to within the range of 1 to the number of the ridges 249 depending to the drill thickness, the hardness of the works and the like. Further, the along-ridge groove 253 may be out of communication with the groove 248. Also, the along-ridge groove 253 may extend only in the pyramidal section 247, or may terminate by the holding section 275.

The size and/or number of the discharge grooves 224 may be changed. The discharge groove 224 may be such that it does not communicate with the groove 291.

What is claimed is:

1. A drill comprising a holding section, a prismal section receivable by the holding section, and a top-truncated, right pyramidal section, which is integral with the prismal section:

the prismal section having side faces and side ridges defined by the adjoining two side faces, the top-truncated, pyramidal section having end faces which taper and converge on the axis of rotation of the drill, end ridges which are defined by the meeting of the adjoining two end faces, and a truncated surface extending across the axis of rotation and forming an angle of more than 1 to less than 90° with the cross-section of the prismal section, and the end faces and end ridges of the pyramidal section extending from said side faces and side ridges of the prismal section, respectively.

2. A drill according to claim 1 in which the top-truncated surface has therethrough a first groove.

3. A drill according claim 2 in which the prismal section has therethrough a communicating groove in communication with the first groove.

4. A drill according to claim 2 in which the pyramidal section has therethrough a discharge groove extending through the pyramidal section and the prismal section.

5. A drill according to claim 1 in which there is provided an open hole extending through the holding section and the prismal section.

6. A drill according to claim 2 in which the holding section is, at least in part, smaller, in diameter, than the prismal section.

7. A drill according to claims 1 in which the pyramidal section has therethrough a discharge groove extending through the pyramidal section and the prismal section.

8. A drill according to claim 1 in which there is provided an open hole extending through the holding section and the prismal section.

9. A drill according to claim 4 in which there is provided an open hole extending through the holding section and the prismal section.

10. A drill according to claim 1 in which the holding section is, at least in part, smaller, in diameter, than the prismal section.

11. A drill according to claim 4 in which the holding section is, at least in part, smaller, in diameter, than the prismal section.

12. A drill according to claim 7 in which the holding section is, at least in part, smaller, in diameter, than the prismal section.

13. A drill according to claim 3 in which the pyramidal section has therethrough a discharge groove extending through the pyramidal section and the prismal section.

14. A drill according to claim 3 in which there is provided an open hole extending through the holding section and the prismal section.

15. A drill according to claim 3 in which the holding section is, at least in part, smaller, in diameter, than the prismal section.

* * * * *